Patented July 5, 1927.

1,634,659

UNITED STATES PATENT OFFICE.

EDWARD F. FLAMMER, OF NEW YORK, AND HALSEY E. SILLIMAN, OF BROOKLYN, NEW YORK, ASSIGNORS TO RAINBOW PHOTO REPRODUCTIONS, INC., OF NEW YORK, N. Y., A CORPORATION OF NEW YORK.

PHOTOPRINTING.

No Drawing. Application filed January 11, 1926, Serial No. 80,667, and in Canada December 26, 1925.

Our invention relates to improvements in photoprinting and more particularly to photoprinting wherein a gelatine or colloid film printing plate is used. The object of the invention is to provide a method of printing with such plates which is not only simple and economical, but which also produces reproductions of high quality and novel in character. Further and more specific objects, features and advantages will more clearly appear from the detail description below.

To enable those skilled in the art to carry out our invention we will, as an illustration, describe in detail our preferred method of carrying the same into effect, with the understanding however that many changes and modifications may be made and the invention embodied in widely different forms without departing from the spirit and scope thereof in its broader aspects.

We first take a sheet metal plate of zinc, or preferably Monel metal, and roughen one side thereof with a lithographic grain in a manner well understood by those skilled in the art. With this surface clean and dry we place thereon a thin layer of a binding solution. This solution may be made up of about 3% of gelatine, about 50% water and about 47% silicate of soda. The plate with the thin layer of binder solution is placed in a whirling apparatus with said surface horizontal and uppermost and the plate whirled or rotated in a horizontal plane about an axis passing substantially through the center of the plate, in a manner well understood by those skilled in the art. The whirling removes any excess of the solution and is continued until the treated surface is dry.

We next apply to the plate on top of the dried layer of binder solution a coat or film of sensitized gelatine emulsion. This emulsion may be made up of about 9 pounds of water in which is dissolved 1 pound of gelatine by volume and to this solution there is admixed 1 pound of a 5% solution potassium bichromate in water. The potassium bichromate acts to sensitize the gelatine in a manner well understood by those skilled in the art. The solution with the chromic acid salt sensitizer therein is then applied to the plate so as to form a coating or layer thereof on top of the dried binder solution. The solution is allowed to assume a uniform layer on the plate, and the plate is again whirled as before for 15 minutes but in an oven heated preferably to 140° F. as near as possible. This treatment dries the sensitized gelatine emulsion on the plate and produces a wavy line graining or reticulation in the surface of the dried emulsion. The binding solution causes the sensitized emulsion to adhere firmly to the grained surface of the metal plate.

The plate is then exposed in the manner common in the making of collotype printing plates behind a negative, or in any suitable manner.

After this exposure the plate is washed with water to wash out the bichromate which has been unaffected by the light of exposure. This washing may be done by allowing cool tap water to run over the plate for about 5 minutes and then leaving the plate in a tank of cold water for about 15 minutes, while gradually changing the water in the tank by allowing tap water to run in and providing a suitable overflow, in a manner well understood by those skilled in the art.

Then the plate is removed, and, without drying or applying glycerine or equivalent solution as has been common, the plate is placed in a tray of a solution of hydroquinone for about 1½ hours. This solution is preferably made by dissolving 20 grams of dihydroxy-benzene such as hydroquinone in 1000 c. c. of water. This treatment hardens the light exposed parts of the film much more than it does the light unaffected portions. Tests indicate that while the hydroquinone acts on the portions of the film which have been unaffected by light to increase the hardness thereof (i. e. decrease its water absorbent capacity) to some extent, it nevertheless acts on the light affected portions to increase the hardness thereof to a much greater extent, so that the hardness of the latter and its water repellent property is materially increased. This action is quite different from that of certain other so-called hardening agents. When the film, with the unaltered or light unaffected bichromate removed, is treated with hydroquinone or its equivalent, the light affected portions are very materially hardened and the required difference in hardness is not obtained by an increase in softness or water absorbing capacity of the other portions.

After thus treating the plate with the hydroquinone solution it is washed in a tank of changing water for about 10 minutes and then it is placed in a tray of chrome alum solution for about ½ hour to harden or toughen the whole area of the film. The plate is then again washed in the tank of changing water for about 10 minutes when it is ready for printing. The plate has a continuous gelatine film thereon, i. e., the gelatine is not washed away or removed to produce the high lights.

In printing with the plate it may be placed either in a flat bed press or on the cylinder of a rotary cylinder press in any suitable or well known manner.

The press is provided with a water roller or rollers which, before each printing impression apply water to the film to maintain moist the portions which have not been selectively hardened whereby they will repel greasy ink. The press is also provided with a roller or rollers which apply to the film, before each printing impression a greasy ink of any well known or suitable kind and the portions of the film which have been selectively hardened and affected by the light, selectively take up the ink and deposit it upon the articles to be printed upon. The other portions of the film which have been relatively unaffected by the light of exposure, being damp with moisture, repel the ink so that they produce the lights of the picture.

Instead of printing directly from the gelatine plate on the final paper or the like, the ink from the gelatine plate may be transferred to a suitable transfer roll and from that printed on the final paper or the like, in a manner which will be clear to those skilled in the art. Also lithographic reproductions in a plurality of colors may be easily produced by providing a separate printing plate for each color and using different colored inks therewith and printing with these plates consecutively as will be clearly understood by those skilled in the art.

According to our process in its preferred form, reproductions are obtained with extremely beautiful tonal effects and with fine contrasts and deep shadows substantially like photographs in appearance. The "blacks" come out practically solid which is impossible with the ordinary methods using half tone screens, etc.

What we claim as new and desire to secure by Letters Patent is:

1. The process which consists in providing a colloid film sensitized with a chromic acid salt, exposing the film photographically, washing the film to remove chromic acid salt unaffected by light, subjecting the film to a reagent which acts on the portions of the film which have been unaffected by light to increase the hardness thereof, but which also acts on the light affected portions of the film to increase the hardness thereof to a much greater extent, and without removing the colloid from the first mentioned portions of the film, applying a greasy ink to the film and printing therewith while maintaining moist with water the portions unaffected by the light, the portions which have been affected by light, selectively receiving the ink and depositing it upon the article printed upon.

2. The process which consists in providing a colloid film sensitized with a chromic acid salt, exposing the film photographically, washing the film to remove chromic acid salt unaffected by light, subjecting the film to a reagent which acts on the portions of the film which have been affected by the light to materially increase the hardness thereof, without similarly increasing the hardness of the portions of the film which have been unaffected by the light, and applying a greasy ink to the film and printing therewith while maintaining moist with water the portions unaffected by the light, the portions which have been affected by light, selectively receiving the ink and depositing it upon the article printed upon.

3. The process which consists in providing a colloid film sensitized with a chromic acid salt, exposing the film photographically, washing the film, to remove chromic acid salt unaffected by light, subjecting the film to a reagent which acts on the portions of the film which have been unaffected by light to increase the hardness thereof, but which also acts on the light affected portions of the film to increase the hardness thereof to a much greater extent, treating the film to harden the whole area thereof, and without removing the colloid from the first mentioned portions of the film, applying a greasy ink to the film and printing therewith while maintaining moist with water the portions unaffected by the light, the portions which have been affected by the light, selectively receiving the ink and depositing it upon the article printed upon.

4. The process which consists in providing a colloid film sensitized with a chromic acid salt, exposing the film photographically, washing the film, to remove chromic acid salt unaffected by light, subjecting the film to a hydroquinone which acts on the portions of the film which have been affected by the light to materially increase the hardness thereof, without similarly increasing the hardness of the portions of the film which have been unaffected by the light, and without removing the colloid from the first mentioned portions of the film, applying a greasy ink to the film and printing therewith while maintaining moist with water the portions unaffected by the light, the portions which have been affected by light, selectively receiving the ink and depositing it upon the article printed upon.

5. The process which consists in providing a colloid film sensitized with a chromic acid salt, exposing the film photographically and without any screen, washing the film to remove chromic acid salt unaffected by light, subjecting the film to a reagent which acts on the portions of the film which have been affected by the light to materially increase the hardness thereof, without similarly increasing the hardness of the portions of the film which have been unaffected by the light, and applying a greasy ink to the film and printing therewith while maintaining moist with water the portions unaffected by the light, the portions which have been affected by light, selectively receiving the ink and depositing it upon the article printed upon.

6. The process which consists in providing a colloid film sensitized with a chromic acid salt, exposing the film photographically and without any screen, washing the film to remove chromic acid salt unaffected by light, subjecting the film to a hydroquinone which acts on the portions of the film which have been unaffected by light to increase the hardness thereof, but which also acts on the light affected portions of the film to increase the hardness thereof to a much greater extent, and without removing the colloid from the first mentioned portions of the film, applying a greasy ink to the film and printing therewith while maintaining moist with water the portions unaffected by the light, the portions which have been affected by light, selectively receiving the ink and depositing it upon the article printed upon.

7. The process which consists in exposing a sensitized colloid film photographically, selectively hardening the light affected portions of the film, by treatment with hydroquinone, applying a greasy ink to the film and printing therewith without removing the portions of the film which have not been selectively hardened.

8. The process which consists in exposing a sensitized colloid film photographically, selectively hardening the light affected portions of the film by treatment with hydroquinone, and also hardening the whole area of the film applying a greasy ink to the film and printing therewith without removing the portions of the film which have not been selectively hardened, also applying water to the film before each impression in printing to maintain moist the portions which have not been selectively hardened whereby they will repel the greasy ink the portions of the film which have been affected by the light and selectively hardened, selectively receiving the ink and depositing it upon the article to be printed upon.

In testimony whereof we have signed our names to this specification.

EDWARD F. FLAMMER.
HALSEY E. SILLIMAN.